E. E. SLICK.
WHEEL CONSTRUCTION.
APPLICATION FILED JUNE 6, 1911.
1,001,087. Patented Aug. 22, 1911.
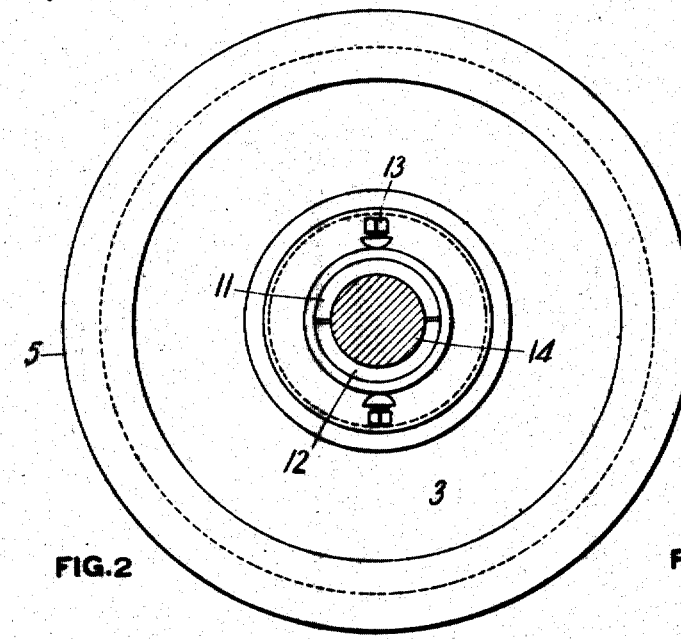
FIG. 2
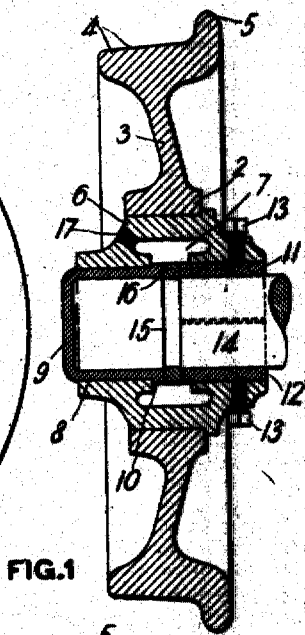
FIG. 1
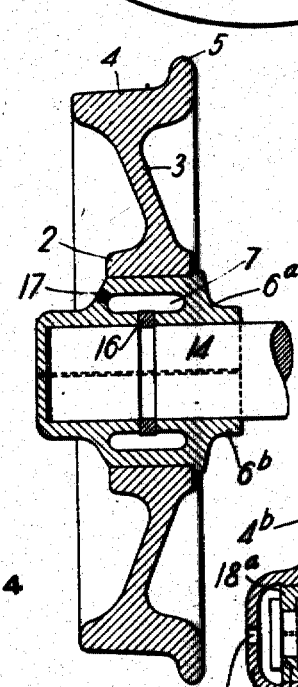
FIG. 4
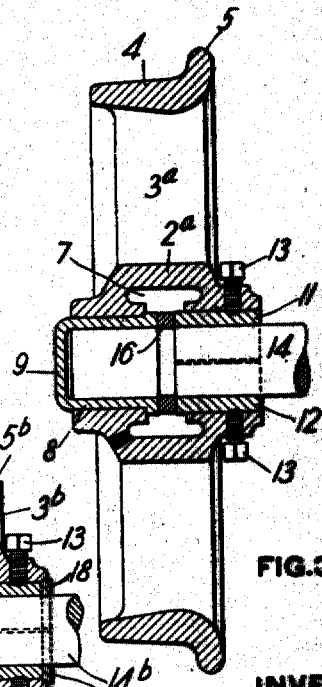
FIG. 3
FIG. 5
WITNESSES
R. D. Little
M. P. Alexander
INVENTOR
Edwin E. Slick
by Linthicum Bell & Fuller
his Attorneys

UNITED STATES PATENT OFFICE.

EDWIN E. SLICK, OF PITTSBURG, PENNSYLVANIA.

WHEEL CONSTRUCTION.

1,001,087.  Specification of Letters Patent.  Patented Aug. 22, 1911.

Application filed June 6, 1911. Serial No. 631,648.

*To all whom it may concern:*

Be it known that I, EDWIN E. SLICK, a citizen of the United States, residing at Pittsburg, in the county of Allegheny, State of Pennsylvania, have invented certain new and useful Improvements in Wheel Constructions, of which the following is a specification.

My invention relates to the construction of wheels, and more particularly relates to the construction of the types of car wheels adapted to rotate or turn upon the wheel seat of the axle upon which the wheels are secured.

One object of my invention is to provide a wheel of improved construction having novel means whereby the relatively movable contacting surfaces of the wheel and its axle are supplied with oil or other lubricating material, such surfaces are lubricated in an effective manner, and the loss of lubricating material through leakage is prevented and overcome.

Another object of this invention is to provide a wheel having an axle eye in its hub portion constructed and arranged to securely maintain the wheel in place and having novel means for storing a supply of lubricant and for preventing displacement of the wheel on the axle to which the wheel is applied for use.

A further object of the invention is in the combination and arrangement of the parts forming the wheel, as will more fully appear hereinafter.

Referring to the drawings forming part of this specification, Figure 1 is a sectional elevation of a forged car wheel constructed and arranged in accordance with my invention. Fig. 2 is a plan of the same. Fig. 3 is a sectional elevation of a cast car wheel constructed and arranged in accordance with this invention. Fig. 4 is a sectional elevation of a forged car wheel showing a modified construction made in accordance with my invention. Fig. 5 is a sectional detail showing a further modification in the construction of the hub of a wheel also made in accordance with my invention.

In the accompanying drawings, referring to Figs. 1 and 2, a forged metal car wheel is shown having a hub 2 connected by an integral web 3 with a tread 4 having a flange 5. The axle eye in the hub 2 is provided with a removable bushing 6 having an annular recess 7 opening into the axle eye and forming a cellar or reservoir in which a supply of oil or other lubricating material is maintained. Inserted within the bushing 6 is a second bushing 8 made in sections and one section having a closed outer end 9 and a marginal flange 10 on its inner end. Two lengthwise separated sections 11 and 12 are also inserted within the opening in the bushing 6 and set screws 13 are provided on the bushing 6 to maintain the sectional inner bushing in position when assembled in place. Located within the sectional bushing formed of the parts 8, 11 and 12 is the wheel seat of the axle 14 upon which the wheel is rotatably secured when in use, the wheel seat of this axle as shown being provided with an annular recess 15 upon which a collar 16 is shrunk so as to form a thrust ring.

By reference to Fig. 1 it will be seen that the opposite faces of the collar formed by the ring 16 are in engagement with the adjacent ends of the parts 8, 11 and 12 of the inner bushing so as to form thrust surfaces which take the side thrust put upon the wheel when in use. To permit of the parts being assembled, the inner bushing formed by the parts 11 and 12 is split transversely of its length to enable the axle eye with its thrust collar to be placed in position within the opening in the wheel hub.

In Fig. 3 a cast wheel is shown having a tread 4, flange 5, and, instead of having an integral web as shown in Figs. 1 and 2, in this construction spokes 3ᵃ formed integral with the hub 2ᵃ and rim or tread 4, are employed. This wheel being molded and then cast, the annular recess 7 is formed in the hub portion 2ᵃ of this wheel. The bushing 8 with the closed outer end 9 and the longitudinally divided portion of the bushing formed by the parts 11 and 12, are constructed as in Fig. 1 and the bushing is maintained in place in the axle eye of the wheel by means of set screws 13 in a similar manner to that shown by Fig. 1. The wheel seat of the axle 14 is provided with a thrust collar 16 constructed in the same manner as shown in Fig. 1.

In Fig. 4 a modified form of construction is shown in which the hub 2, web 3, tread portion 4 and flange portion 5 are the same as in Fig. 1. The sectional bushing in the eye of the wheel hub in this construction is different in being split lengthwise into two parts, 6ᵃ and 6ᵇ, and the so-formed bushing is provided with an annular recess 7 forming a reservoir or cellar in a similar manner to that shown in Figs. 1 and 3. The wheel seat on the axle 14 is the same as in the preceding figures and a similar thrust ring 16 is provided.

In Fig. 5 a further modification is shown in which the hub portion 2$^b$ of a cast wheel is joined by spokes 3$^b$ to a tread portion 4$^b$ and flange portion 5$^b$. In this construction the hub 2$^b$ is provided with an annular recess or pocket 7 forming the oil cellar or reservoir in a manner similar to that shown in Fig. 3, the outer end of the axle eye in the hub 2$^b$ being provided with a closed end 2$^c$. A bushing 18 which is split lengthwise is inserted in the axle eye of this wheel and is securely held in position therein by means of set screws 13. This bushing is provided with an annular inwardly extending flange 18$^a$ which is adapted to enter the recess 18$^b$ formed in the wheel seat of the axle 14$^b$ on which the wheel is mounted so as to provide thrust surfaces which also serve to maintain the wheel in place on the axle 14$^b$. Openings or holes 19 in the bushing 18 communicate with and connect the oil cellar 7 with the interior of the split bushing 18. An opening 17 or 17$^a$ is provided in each wheel hub through which lubricant is introduced into the reservoir or oil cellar formed by the recess or pocket 7.

The advantages of my invention will be appreciated by those skilled in the art. The apparatus is simple and is easily kept in repair. By its use the wheel seats on the axles are constantly supplied with lubricant, ample thrust surfaces are provided, the wheels are effectively held in place and the bearing surfaces taking the end thrust are always being supplied from a pool of lubricating material.

Modifications in the construction and arrangement of the parts may be made without departing from my invention as defined in the claims. The thrust rings may be formed integral on the axles instead of being shrunk in place as shown in Figs. 1, 2, 3 and 4. The number of parts used in forming the bushing can be varied and other changes may be made.

I claim:

1. A wheel comprising a hub, a sectional bushing in the eye of said hub and turning on the axle with the wheel, the sections of said bushing having adjoining end surfaces intermediate the ends of the wheel hub arranged to form an annular recess and adapted to provide thrust surfaces engaging with the side surfaces of the thrust collar on said axle.

2. A wheel comprising a hub, a sectional bushing secured in the eye of said hub and turning on the axle with the wheel, said bushing having a closed outer end and having adjoining end surfaces intermediate the ends of the wheel hub arranged to form an annular recess therein and adapted to provide thrust surfaces engaging with the side surfaces of the thrust collar on said axle.

3. A wheel comprising a hub, a sectional bushing secured in the eye of said hub and turning on the axle with said wheel, said bushing having adjoining end surfaces intermediate the ends of the wheel hub arranged to form an annular recess therein and adapted to provide thrust surfaces engaging with the side surfaces of the thrust collar on said axle, and means for maintaining the sectional bushing in place.

4. A wheel comprising a hub, a sectional bushing in the eye of said hub turning on the axle with the wheel, said bushing having a closed outer end and having adjoining end surfaces intermediate the ends of the wheel hub arranged to form an annular recess therein and adapted to provide thrust surfaces engaging with the opposite side surfaces of the thrust collar on the axle, and means for maintaining the sectional bushing in place.

5. A wheel comprising a hub, a bushing secured in the eye of said hub having an annular recess forming a lubricant cellar or reservoir and a sectional bushing turning on the axle with the wheel, said bushing having adjoining end portions forming thrust surfaces adapted to engage with the opposite side surfaces of the thrust collar on the axle and means for retaining the bushing in place in the wheel hub.

6. A wheel and axle construction having a wheel hub and a sectional bushing in said hub, the sections of said bushing having adjoining end surfaces arranged to form an annular recess on the interior thereof and adapted to provide thrust surfaces engaging with the side surfaces of a thrust collar on the axle.

In testimony whereof, I have hereunto set my hand.

EDWIN E. SLICK.

Witnesses:
G. W. NEILL,
H. M. CORWIN.